Oct. 20, 1936.　　　　L. N. HAYDEN　　　　2,058,311

ATTACHING EYELET

Filed June 30, 1934

Inventor:
Lester N. Hayden,
by Walter S. Jones
Atty

Patented Oct. 20, 1936

2,058,311

UNITED STATES PATENT OFFICE 2,058,311

ATTACHING EYELET

Lester N. Hayden, Arlington, Mass., assignor to United-Carr Fastener Corporation, Cambridge, Mass., a corporation of Massachusetts Application June 30, 1934, Serial No. 733,261

1 Claim. (Cl. 85—40)

My invention aims to provide improvements in attaching members for snap fastener and like installations.

In the drawing, which illustrates a preferred form of my invention:—

Figure 1:
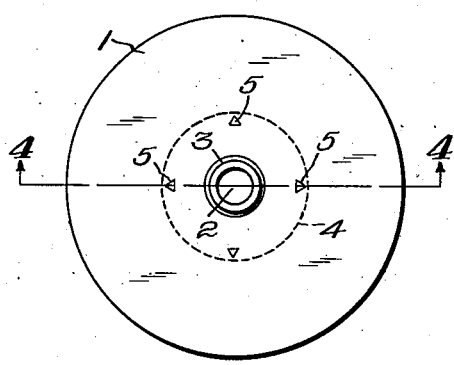
Figure 1 is a top plan view of my improved eyelet.
Figure 2:
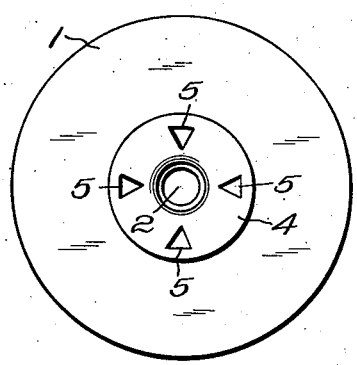
Fig. 2 is a bottom plan view of my improved eyelet.
Figure 3:
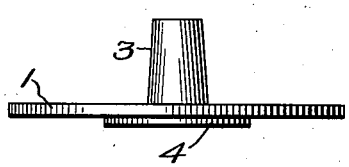
Fig. 3 is a side elevation of my improved eyelet.

The specific form of my invention as illustrated in the drawing presents an extremely simple method of preventing eyelets or other similar attaching members from pulling through the supporting fabric. It is especially useful on pocketbooks and handbags where the strain is apt to be greater than the ordinary eyelet is designed to sustain. Eyelets have been made in the past with over-size metal bases, but the cost of such eyelets is so great as to be almost prohibitive. Also eyelets with small bases have been reinforced with improvised washers of cardboard scraps in an attempt to prevent the pulling out of the eyelet; but this requires excessive handling of the various parts by the operator and makes it impossible to assemble the parts with a fully automatic machine. My improved eyelet, on the other hand, can be successfully fed through a full-automatic assembly machine without danger of jamming, and entirely precludes the necessity for handling any extra parts.

Figure 4:
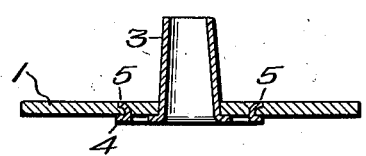
Fig. 4 is a section on the line 4—4 of Fig. 1.

The form of reinforcement and enlargement of the base of the eyelet I have shown in the drawing consists of a cardboard or fibreboard washer 1 of relatively thin but rigid material. The washer has a central aperture 2 through which is passed the neck 3 of the eyelet. The base 4 of the eyelet is provided with a series of integral prongs 5 preferably formed from the material of the base, which are bent into engagement with the washer 1 as illustrated in Fig. 4. Thus the washer is made a part of the eyelet and assembly with a stud, or the like, is carried out in the usual manner.

Figure 5:
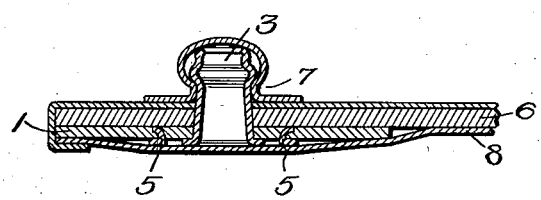
Fig. 5 is a cross-section through a complete assembly including my novel eyelet.

In the drawing, I have shown a hollow-shank collapsible eyelet of familiar design, and a hollow stud with which the eyelet engages. The manner of assembly is illustrated by Fig. 5 of the attached drawing. A hole of proper size is first punched in the fabric 6; the eyelet is inserted in the hole and the stud placed over the top. A tool fits over the stud and pressure is applied, forcing the stud down onto the fabric and causing the hollow shank of the eyelet to collapse, thereby engaging the constricted neck of the stud 7. A further step is the application of the inner lining 8, which covers up the base of the eyelet. While I have shown only a hollow-shank eyelet, it must be remembered that my novel structure may be used with other types of eyelets as well.

While I have illustrated and described a preferred form of my invention, I do not wish to be limited thereby, as the scope of my invention is best defined by the following claim.

I claim:

A reinforced attaching device complete in and of itself and adapted to be used for attaching snap fastener studs to fabrics or the like, said device including a metallic attaching member having a circular base, an externally smooth elongated shank extending perpendicularly from the center of said base for engaging a member to be attached, a disc of cardboard or the like material of greater diameter than the base of said metallic attaching member for increasing the area of that portion of the device which engages one face of the supporting fabric or the like, said disc having a centrally located aperture adapted to receive said shank and said shank being passed through said aperture, said circular base of the metallic attaching member having a plurality of integral prongs extending upwardly from it into said cardboard or the like disc and having their ends clinched to secure said disc against said base for the purpose described.

LESTER N. HAYDEN.